Oct. 11, 1949.　　　　　B. F. GREGORY　　　　　2,484,220
HYDRAULIC TRANSMISSION
Filed June 19, 1943　　　　　　　　　　　　　3 Sheets-Sheet 2

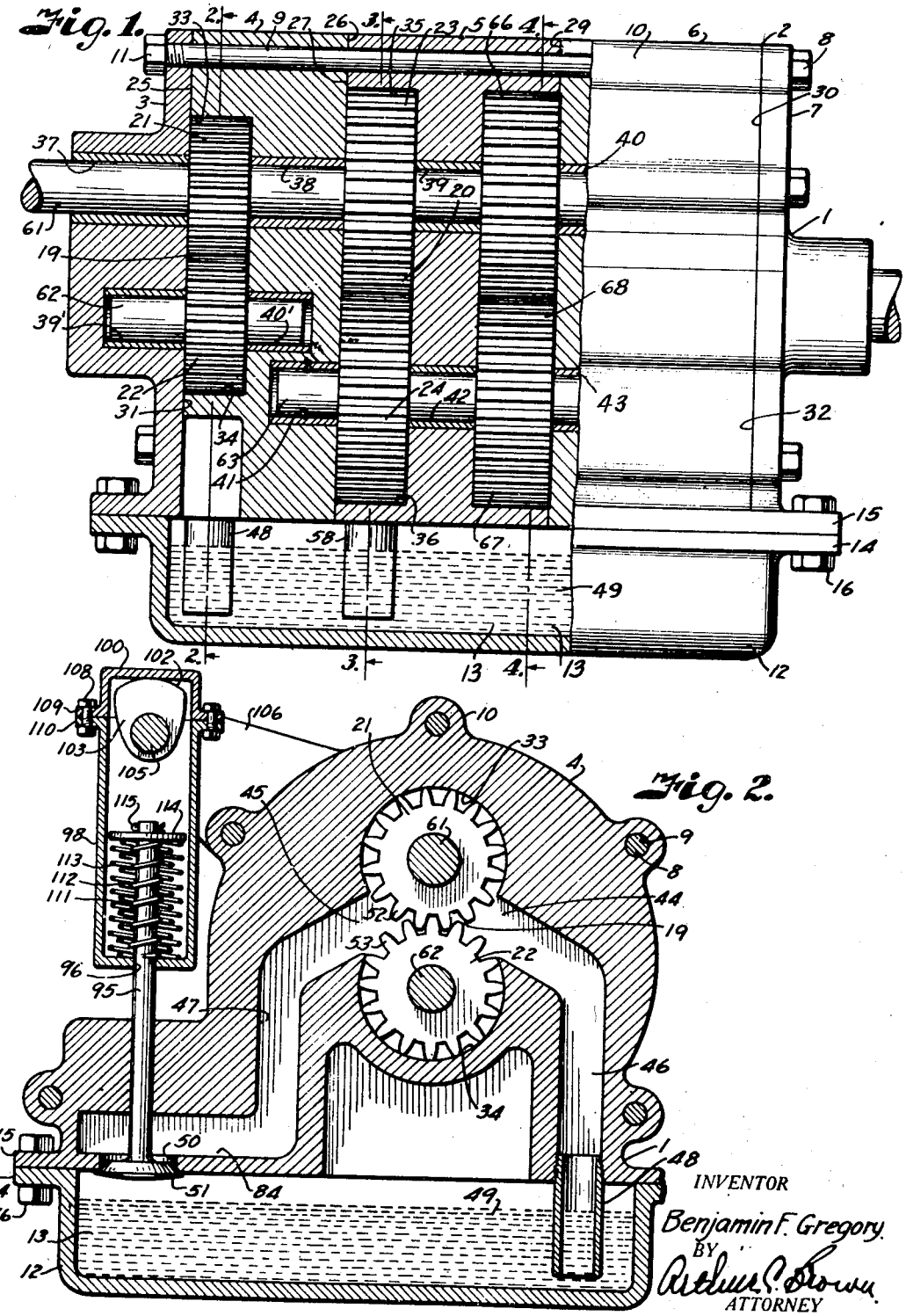

INVENTOR
Benjamin F. Gregory
BY
Arthur C. Brown
ATTORNEY

Oct. 11, 1949.                B. F. GREGORY                2,484,220
                           HYDRAULIC TRANSMISSION
Filed June 19, 1943                                  3 Sheets-Sheet 3

INVENTOR
Benjamin F. Gregory
BY
Arthur C. Brown
ATTORNEY

Patented Oct. 11, 1949

2,484,220

UNITED STATES PATENT OFFICE 2,484,220

HYDRAULIC TRANSMISSION

Benjamin F. Gregory, Kansas City, Mo., assignor, by mesne assignments, of one-half to Martha Realty Company, a corporation of Missouri Application June 19, 1943, Serial No. 491,492

5 Claims. (Cl. 103—11)

This invention relates to hydraulic transmissions for transmitting power of a prime mover to a driven mechanism and has for its principal objects to provide a relatively small, compact and highly efficient unit including a plurality of fluid pressure generators; and to provide for constant operating speed of the fluid pressure generators and variable pressure on the discharge side of the generators through selective release of excess pressure fluid to the low pressure side of the generators.

In accomplishing these and other objects of the invention, I have provided improved details of structure, the preferred form of which is illustrated in the accompanying drawings, wherein:

Fig. 1 is a vertical longitudinal section through a hydraulic transmission embodying the features of the present invention, a part of the casing being shown in elevation.

Fig. 2 is a cross section on the line 2—2 of Fig. 1.

Figure 3:
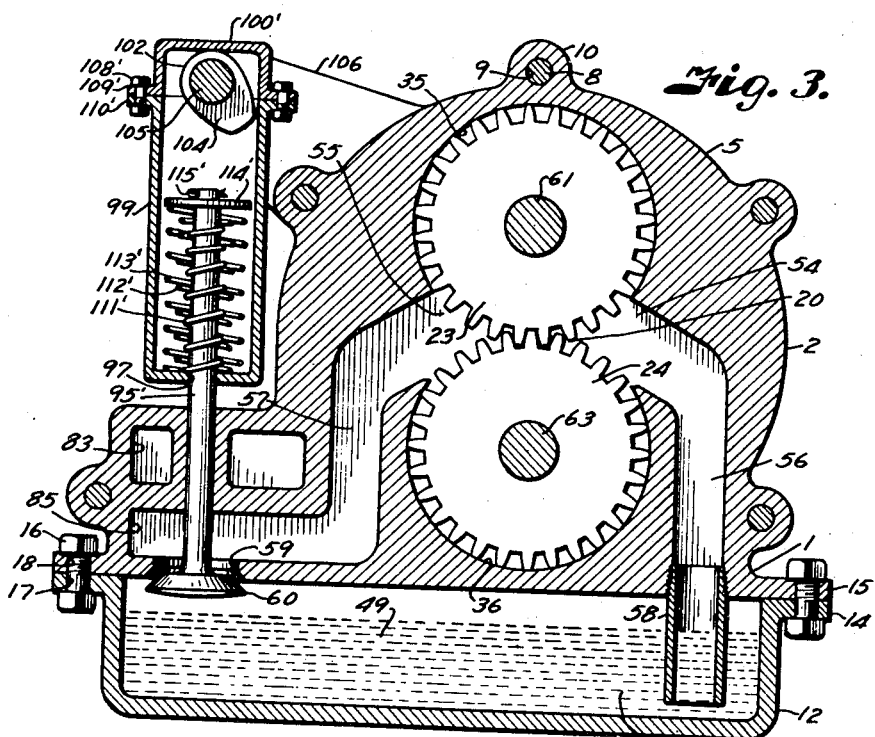
Fig. 3 is a cross section on the line 3—3 of Fig. 1.

Referring more in detail to the drawings:

1 designates a hydraulic transmission constructed in accordance with the present invention to provide a relatively small, compact operating unit substantially self-contained within a casing 2. For convenience in construction and assembly, the casing 2 is formed of a plurality of sections, 3, 4, 5, 6 and 7, secured together to provide leak-tight joints therebetween by draw bolts 8 extending through bores 9 that are provided in ears 10 of the respective sections, the ends of the rods being threaded to accommodate nuts 11 thereon. Attached to the bottom of the assembled sections is a pan-shaped member 12 substantially coextensive with the lower portions of the sections to form a fluid supply and storage chamber 13. The pan-like member 12 has a marginal flange 14 projecting therefrom to cooperate with a similar flange 15 on the first named sections for attaching the pan-like member 12 by means of fastening devices 16 extending through suitable openings 17 and 18 in the respective flanges. The sections 4 and 5 house fluid pressure generators 19 and 20 which may comprise gear pumps, including driven and idler gears 21—22 and 23—24 respectively. The sections 4, 5, and 6 have plane side faces 25—26, 27—28 and 29—30. The faces 26 and 27 and 28 and 29 contact each other and the faces 25 and 30 contact flat faces 31 and 32 of the end sections 3 and 7.

The gears forming the pumps are rotatable within substantially cylindrical chambers or bores 33—34 and 35—36 extending inwardly from the face sides 25 and 27 to a depth sufficient for accommodating the thickness of the respective gears. The cylindrical bores 33 and 35 are arranged with their axes in alignment and in coaxial registry with aligning bearings 37, 38, 39 and 40 in the sections 3, 4, 5 and 6 respectively. The gears 21 and 22 are of smaller diameter than the gears 23 and 24 to provide pumps of different capacity and therefore the axes of the chambers 34 and 36 are offset but located parallel to respectively align with bearings 39' and 40' in the sections 3 and 4 and bearings 41, 42 and 43 in the sections 4, 5 and 6. The chambers 33 and 34 intersect as shown in Fig. 2 and are provided with inlet and exhaust ports 44 and 45 connected with channels 46 and 47 that are formed within the section 4. The channel 46 extends downwardly through the section 4 and connects with a nipple 48 having its inlet submerged within the body 49 of pressure fluid contained within the storage compartment 13. The channel 47 connects with a valve port 50 opening into the storage chamber 13 and which is under control of a valve 51, later described. The gears closely fit within the respective chambers and have meshing teeth 52 and 53.

The gears 23 and 24 seat in a similar manner within their respective chambers which are provided with inlet and outlet ports 54 and 55 (Fig. 3) which connect with channels 56 and 57, the channel 56 being connected with a nipple 58 depending within the body of pressure fluid and the channel 57 connects with the storage compartment through a valve port 59, the port being under control of a valve 60, later described. The gears 21 and 23 are fixed to a driving shaft 61 rotatably mounted in the bearings 37, 38, 39 and 40 while the gears 22 and 24 are fixed to stub shafts 62 and 63, the shaft 62 being rotatably supported in the bearings 39' and 40' and the shaft 63 being rotatably supported in the bearings 41, 42 and 43.

Figure 4:
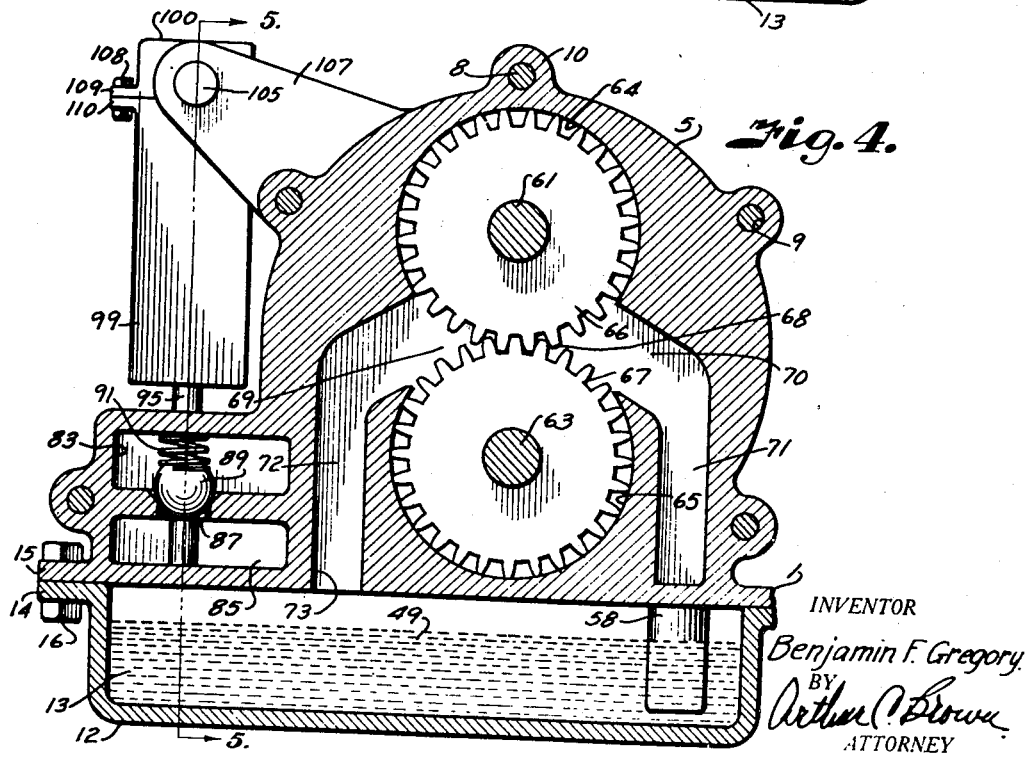
Fig. 4 is a cross section on the line 4—4 of Fig. 1.
Figure 5:
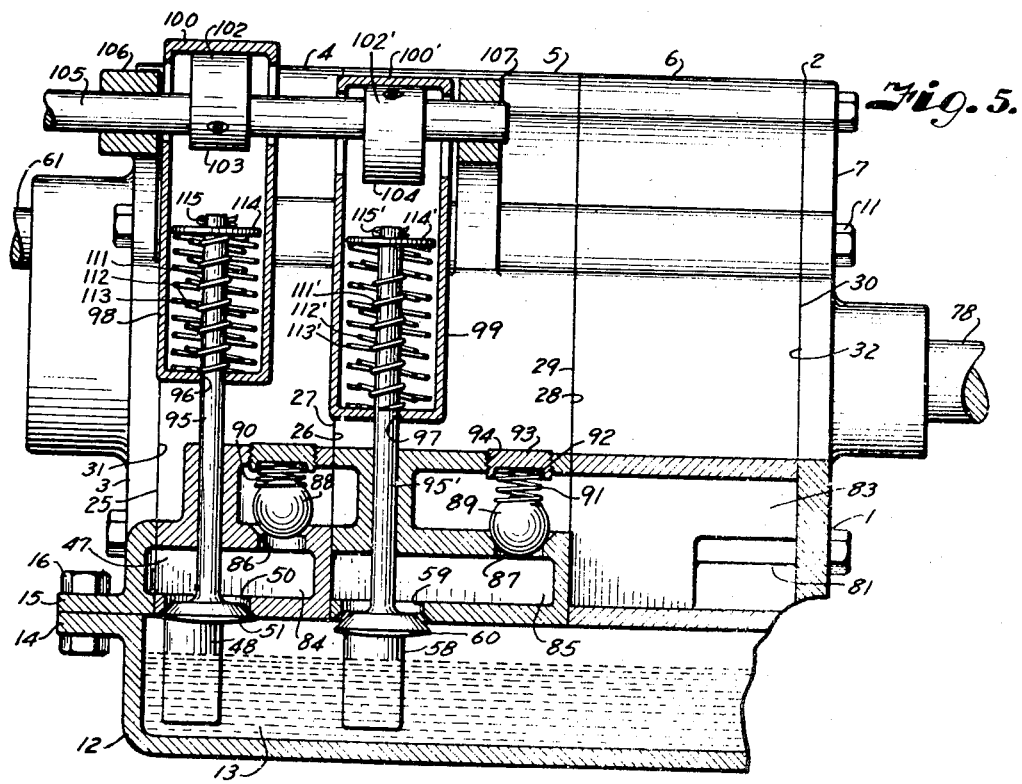
Fig. 5 is a longitudinal section through the transmission on the line 5—5 of Fig. 4.

Formed in the side face 28 of the section 5 are intersected chambers 64 and 65 (Fig. 4) mounting gears 66 and 67 of a suction pump 68, the gear 66 being fixed to the driving shaft 61 and the gear 67 to the shaft 63. Formed in the intersecting portions of the bores on the respective sides of the meshing points of the gears 66 and 67 are ports 69 and 70. The port 70 is connected by a channel 71 with the discharge side of the driven unit and the port 69 is directly connected with a channel 72 discharging through a port 73 into the storage compartment. The gears 66 and 67 may be of any suitable diameter but to provide a pump of the necessary capacity are illustrated in the present drawing as being substantially the size of the gears forming the larger of the pressure generating pumps.

Pressure fluid from the channels 47 and 57 is discharged through ports 86 and 87 normally closed by check valves 88 and 89 to prevent back flow from a channel 83 which delivers the pressure fluid to a port 81 leading to a suitable motor (not shown) that is contained in the casing section 6. The check valves 88 and 89 are yieldingly retained in engagement with their seats by springs 90 and 91 engaging in sockets 92 of plugs 93 closing openings 94 through which the check valves are inserted.

The control valves 51 and 60 are of the same construction and each includes a stem 95, 95' projecting through openings 96 and 97 in substantially rectangular-shaped frames 98 and 99. The frames 98 and 99 have the upper cross bars 100, 100' suspended upon the peripherial faces 102 of cams 103 and 104. The cams 103 and 104 are oppositely arranged on a rock shaft 105 that is rotatably supported in bearing brackets 106 and 107 projecting upwardly and outwardly with respect to the sections 3 and 5 so that the cams overlie the valve stems 95, 95' as best shown in Figs. 2 and 3. The cross bar portions 100, 100' of the yoke-shaped frames are preferably detachable from the lower portion of the frames to permit ready assembly of the parts, the cross bar portions being secured to the lower portions of the frame by fastening devices such as bolts 108, 108' extending through ears 109, 109' on the upper cross bars and similar ears 110, 110' on the frames. Sleeved ends of the lower section of the frames. Sleeved on the stems of the valves and having their lower ends engaging the lower cross bar portion of the frames are sets of coil springs, each set consisting of springs 111, 112 and 113 for the valve 51 and 111', 112' and 113' for the valve 60, the springs of the sets being of different diameters so that they are sleeved one over the other as shown in Figs. 2, 3 and 6, the springs being effective in successively loading the valves. The upper ends of the springs engage washer-like spring seats 114, 114' that are retained on the valve stems by fastening devices such as pins 115, 115'. The springs are adjusted so that when the low lobe portions of the cams are engaging with the cross bars, the springs are substantially relaxed and the discharge from the pumps flows freely through the port-controlled valves so that the fluid discharged by the pumps returns by way of the valve-controlled ports to the reservoir or low pressure side of the pumps. The cams are arranged so that the high lobe portions come into play successively. A channel 71 (Fig. 4) returns the fluid from the motor.

The operation of a transmission constructed as described is as follows:

The driving shaft 61 is connected to a prime mover, preferably one capable of operating at a constant speed with a given throttled opening. When the prime mover is in operation, the transmission may be placed in neutral position; that is, so that neither of the fluid pressure generating means is effective in operating the driven member. This is effected by positioning the rock shaft so that the springs for both control valves are in relaxed position and there is little or no resistance to flow of fluid discharged by the generators through the valve ports 50 and 59 to the storage chamber 13. With the transmission in operation and the rock shaft 105 set in the position just mentioned, liquid is drawn through the nipples 48 and 58 responsive to action of the generators and is displaced through the ports 45 and 55 and channels 47 and 57 and valve ports 50 and 59. When the rock shaft 105 is rotated to gradually load the springs for the valve 51, the valve resists flow through the port 50 and a portion of the liquid is discharged under pressure past the check valve 88 and through the flow channel 83 to the inlet port 81 rotor and shaft 78. By gradually increasing the loading of the springs for the valve 51, more and more fluid is caused to move through the channel 83. When the smaller of the generators has reached its maximum capacity and all the fluid discharged therefrom is diverted through the channel 83, the other cam moves in position to gradually load the springs for the valve 60 whereupon the generator having the larger gears becomes effective in delivering fluid under pressure to the channel 83. Further adjustment of the rock shaft effects greater loading of the springs up to the point where the maximum discharge of both pumps is effective in operating. It is obvious that gradual unloading of the springs will effect gradual reduction of the pressure fluid until all of the springs are unloaded whereupon the transmission is again in neutral with the prime mover operating at constant speed. The return fluid is drawn through the channel 71 and port 70 by the gears 66 and 67 which return the fluid under pressure to the storage reservoir through the channel 72 and port 73.

From the foregoing it is obvious that I have provided a hydraulic transmission which is of small, compact construction and which is adapted to connect efficiently a prime mover with a driven mechanism with a minimum loss of power for the reason that there is no wire drawing effect on the fluid discharged by the pressure generating pumps, the entire flow being divided to the reservoir and motor proportional to loading of the valves.

What I claim and desire to secure by Letters Patent is:

1. In an apparatus of the character described, a plurality of fluid pressure generators having fluid intake and discharge ports, a common source of fluid supply having separate connections with the intake and discharge ports for each of said generators, duct means having separate ports connected with the respective discharge ports of the fluid pressure generators for conducting the combined effective discharge through said separate ports, check valves controlling said second mentioned ports, a valve controlling flow through each connection between the discharge ports of the fluid pressure generators and the source of supply, and yieldable under discharge of the generators, and means for loading said last named valves in a predetermined order to render said generators effective in the order of loading said valves for maintaining variable pressure in said duct means as the result of the combined effective discharge of the generators into said duct means.

2. In an apparatus of the character described, a plurality of fluid pressure generators having fluid intake and discharge ports, a common source of fluid supply having separate connections with the intake and discharge ports of said generators, a common duct means having separate ports connected with the respective discharge ports of the fluid pressure generators, check valves controlling said second mentioned ports, a valve controlling flow through each of the connections between the discharge ports of the fluid pressure generators and the source of supply and yieldable under discharge of the generator with which said valve is related, and actuating means for successively rendering said valves effective in passing fluid to said common duct means for varying pressure of the fluid in said duct means.

3. In an apparatus of the character described, fluid pressure generators of differential capacity having fluid intake and discharge ports, a common source of fluid supply having separate connections with the intake and discharge ports of the generators, valves controlling flow through the connections between the discharge ports of the generators and the source of supply, said valves being yieldable under discharge pressure of the generators, a common discharge duct having connections with the discharge connections, and means for loading the valves for diverting fluid into the discharge duct for varying pressure in said duct as a result of the combined effective discharge of the pressure generators into said duct.

4. In an apparatus of the character described, a plurality of fluid pressure generators of differential capacity having fluid intake and discharge ports, a common actuator for said generators, a common source of fluid supply for said generators having separate connections with the intake and discharge ports of the generators, valves controlling flow through the connection between the discharge ports of the generator and the source of supply, a variable pressure discharge duct having connection with said discharge ports, stems on the valves, yokes movable relatively to the valve stems, spring seats on the yokes and valve stems respectively, coil springs having ends engaging the respective seats, and means for shifting the yokes relatively to the valve stems to load said springs for effecting discharge of pressure fluid discharged by the generators into said variable pressure duct.

5. In an apparatus of the character described, a plurality of fluid pressure generators of differential capacity having fluid intake and discharge ports, a common actuator for said generators, a common source of fluid supply having separate connections with the intake and discharge ports, duct means having separate ports connected with the respective discharge ports of the fluid pressure generators, check valves controlling said second mentioned ports, valves controlling flow through the connections between the discharge ports of the fluid pressure generators and the source of supply, said valves being yieldable under discharge of the generators, and means for progressively and successively loading said valves to progressively render said generators operative in maintaining predetermined variable pressure in said duct means.

BENJAMIN F. GREGORY.

REFERENCES CITED

The following references are of record in the file of this patent:

UNITED STATES PATENTS

| Number | Name | Date |
|---|---|---|
| 341,534 | Worthington | May 11, 1886 |
| 1,043,480 | Sundh | Nov. 5, 1912 |
| 1,773,268 | Jenkins | Aug. 19, 1930 |
| 1,845,710 | Heginbottom et al. | Feb. 16, 1932 |
| 2,060,684 | Moorhouse | Nov. 10, 1936 |
| 2,185,325 | Barrett et al. | Jan. 2, 1940 |
| 2,237,347 | Grannan et al. | Apr. 8, 1941 |
| 2,274,224 | Vickers | Feb. 24, 1942 |
| 2,275,321 | Scates | Mar. 3, 1942 |

FOREIGN PATENTS

| Number | Country | Date |
|---|---|---|
| 2,019 | Great Britain | Jan. 26, 1910 |
| 324,438 | Great Britain | Jan. 30, 1930 |